US012488034B2

United States Patent
Zhu et al.

(10) Patent No.: US 12,488,034 B2
(45) Date of Patent: Dec. 2, 2025

(54) SEARCHING EDITING COMPONENTS BASED ON TEXT USING A MACHINE LEARNING MODEL

(71) Applicant: Lemon Inc., Grand Cayman (KY)

(72) Inventors: Sijie Zhu, Los Angeles, CA (US); Lu Xu, Los Angeles, CA (US); Fan Chen, Los Angeles, CA (US); Longyin Wen, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/599,097

(22) Filed: Mar. 7, 2024

(65) Prior Publication Data
US 2025/0284723 A1 Sep. 11, 2025

(51) Int. Cl.
G06F 17/00 (2019.01)
G06F 16/334 (2025.01)
G06F 16/338 (2019.01)
G06N 20/00 (2019.01)

(52) U.S. Cl.
CPC .......... G06F 16/338 (2019.01); G06F 16/334 (2019.01); G06N 20/00 (2019.01)

(58) Field of Classification Search
CPC ...... G06F 16/338; G06F 16/334; G06N 20/00
See application file for complete search history.

(56) References Cited

U.S. PATENT DOCUMENTS

| 8,928,665 | B2 * | 1/2015 | Fonseca Da Trindade | G06T 11/206 |
| | | | | 707/798 |
| 11,605,019 | B2 * | 3/2023 | Aggarwal | G06V 30/19147 |
| 2016/0328789 | A1 | 11/2016 | Grosz et al. | |
| 2023/0042221 | A1 | 2/2023 | Xu et al. | |
| 2023/0177388 | A1 * | 6/2023 | Cornec | G06N 20/00 |
| | | | | 706/11 |
| 2023/0418861 | A1 * | 12/2023 | Zhang | G06F 16/535 |

FOREIGN PATENT DOCUMENTS

| CN | 113448477 A | 9/2021 |
| CN | 117351387 A | 1/2024 |
| WO | 2023239358 A1 | 12/2023 |

OTHER PUBLICATIONS

International Search Report and Written Opinion for International Application No. PCT/SG2024/050810, mailed Feb. 17, 2025, 10 pages.

* cited by examiner

*Primary Examiner* — Greta L Robinson
(74) *Attorney, Agent, or Firm* — BakerHostetler

(57) ABSTRACT

The present disclosure describes techniques for searching editing components based on text using a machine learning model. A plurality of visual embeddings indicative of a plurality of visual editing components is acquired by the machine learning model. The plurality of visual embeddings indicative of the plurality of visual editing components is projected into a common space by a first sub-model of the machine learning model. A text query input is received by a user. A text embedding indicative of the text query is generated. The text embedding is projected into the common space by a second sub-model of the machine learning model. At least one visual editing component among the plurality of visual editing components is determined based on the projected text embedding and the plurality of projected visual embeddings in the common space. Information indicative of the at least one visual editing component is displayed via a user interface.

20 Claims, 11 Drawing Sheets

500

Train a machine learning model on training samples, wherein the training samples comprise embeddings indicative of visual editing components and at least one label embedding corresponding to each of the visual editing components 502

Train the machine learning model using a contrastive loss function 504

700

Generate a text description of a particular visual editing component based on a name of the particular visual editing component, wherein the particular visual editing component comprises a visual editing component for training the machine learning model 702

Generate at least one text label associated with the particular visual editing component based on the text description 704

Generate at least one label embedding corresponding to the particular visual editing component based on the at least one text label 706

FIG. 7

SEARCHING EDITING COMPONENTS BASED ON TEXT USING A MACHINE LEARNING MODEL

BACKGROUND

Video has emerged as a major modality of data across various applications, including social media, education, and entertainment. The predominant pipeline for video creation is based on various editing components. Techniques for searching for editing components are desired.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 7 shows an example process for generating label embeddings for training a machine learning model in accordance with the present disclosure.

DETAILED DESCRIPTION OF ILLUSTRATIVE EMBODIMENTS

Many videos are created using editing components every day on various video creation platforms. Such editing components may include, for example, video effects, animation, transitions, filters, stickers, text, etc. But little effort has been made to understand these editing components. Specifically, the relationship between natural text language and the editing components remains unexplored. As such, existing techniques do not enable users to search for editing components using natural language.

Described herein are techniques for searching editing components based on text (e.g., natural language) using a machine learning model. For example, if a user wants to create or edit a video using one or more editing components, the techniques described herein enable the user to search for the editing component(s) using natural language search queries. By enabling users to search for editing components using natural language search queries, the techniques described herein simplify and improve the efficiency of video creation and/or editing processes.

Figure 1:
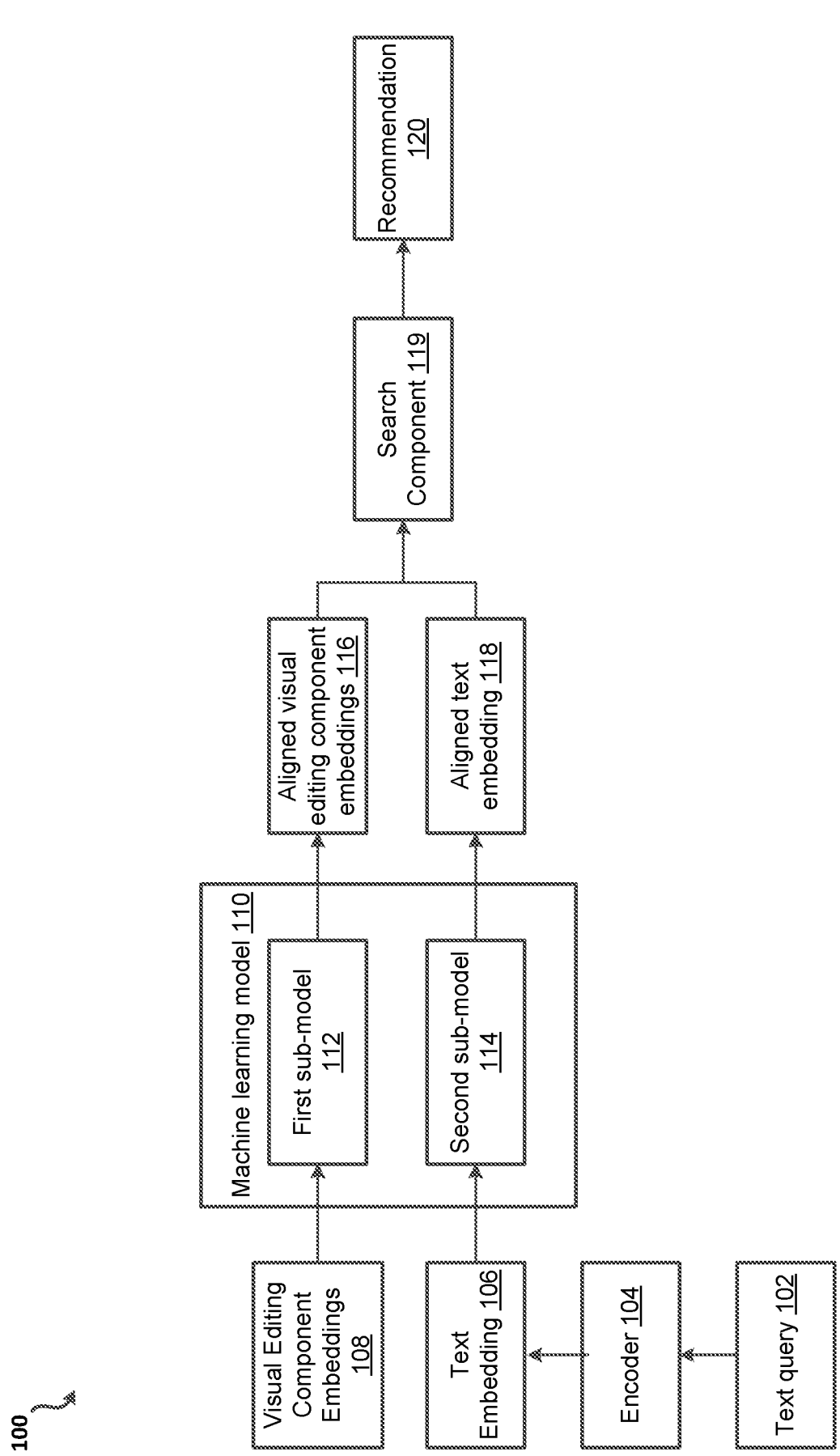
FIG. 1 shows an example system for searching editing components based on text using a machine learning model in accordance with the present disclosure.

FIG. 1 shows an example system 100 for searching editing components based on text using a machine learning model 110. The machine learning model 110 may be trained to align visual embeddings indicative of visual editing components with text embeddings. The machine learning model 110 may be trained to align visual embeddings with text embeddings by projecting the visual embeddings and the text embeddings into a common space. The machine learning model 110 may comprise a first sub-model 112 and a second sub-model 114. The first sub-model 112 may comprise, for example, a first multilayer perceptron (MLP). The second sub-model 114 may comprise, for example, a second multilayer perceptron (MLP).

The first sub-model 112 may receive, as input, visual editing component embeddings 108. The visual editing component embeddings 108 may comprise a plurality of visual embeddings (e.g., representations, vectors, etc.) indicating a plurality of visual editing components. The plurality of visual editing components may comprise, for example, video effects, animations, video transitions, filters, stickers, and/or text (e.g., text overlays). The first sub-model 112 may project the visual editing component embeddings 108 into the common space (e.g., a common dimension). The projected visual editing component embeddings 108 in the common space may be referred to as the aligned visual editing component embeddings 116.

The visual editing component embeddings 108 may be predetermined. For example, the visual editing components embeddings 108 may be stored in a database or library. Each of the visual editing components embeddings 108 may have been generated based on tokens corresponding to image(s) and guidance tokens. The image(s) may comprise content of raw materials and at least one editing component applied on the raw materials. The guidance tokens may provide prior knowledge of possible editing components. The tokens corresponding to the image(s) and the guidance tokens may be input into a different machine learning model (e.g., a machine learning model that is different from the machine learning model 110). The different machine learning model may comprise a cross-attention mechanism. The different machine learning model may generate the visual editing components embeddings 108 based on the tokens corresponding to the image(s) and the guidance tokens.

The second sub-model 114 may receive, as input, a text embedding 106. The text embedding 106 may comprise an embedding (e.g., representation, vector, etc.) indicative of text query 102. The text query 102 may be received from (e.g., input by) a user. The text query 102 may be a natural language query, such as one or more words, phrases, or sentences. The text query 102 may indicate a type of visual editing component or a particular visual editing component that the user is searching for. The user may be searching for a visual editing component for editing and/or creating an image or a video. The text query 102 may be converted into (e.g., encoded into) the text embedding 106 by an encoder 104. The encoder 104 may be, for example, a Contrastive Language-Image Pre-Training (CLIP) encoder. The second sub-model 114 may project the text embedding 106 into the common space (e.g., the common dimension). The projected text embedding 106 in the common space may be referred to as the aligned text embedding 118.

In embodiments, a search component 119 may determine at least one visual editing component among the visual editing components to recommend to the user. The machine learning model 110 may determine at least one visual editing component based on the aligned text embedding 118 and the aligned visual editing component embeddings 116 in the common space. The aligned text embedding 118 and the aligned visual editing component embeddings 116 may have the same dimension in the common space. Thus, the aligned text embedding 118 may be compared to each of the aligned visual editing component embeddings 116 to determine a similarity (e.g., using cosine similarity, K-nearest neighbors, etc.) between the aligned text embedding 118 and each of the aligned visual editing component embeddings 116. The top N (e.g., top one, top two, top three, top five, etc.) aligned visual editing component embeddings of the aligned visual editing component embeddings 116 having a greatest (e.g., highest) similarity to the aligned text embedding 118 may be determined. The determined at least one visual editing component may be those visual editing component(s) corresponding to the top N aligned visual editing component embeddings.

In embodiments, a recommendation 120 may be displayed. The recommendation 120 may comprise information indicative of the at least one visual editing component. The information indicative of the at least one visual editing component may be displayed via a user interface. The information indicative of the at least one visual editing component may be displayed in a list. The user interface may be the same user interface via which the text query 102 was received. Alternatively, the user interface may be a user interface different from the user interface via which the text query 102 was received. The displayed information indicative of the at least one visual editing component may be selectable. For example, a user may be able to select one or more visual editing components of interest based on the displayed information. In embodiments, a video may be received (e.g., uploaded) by the user. The selected visual editing component(s) may be automatically applied to the video in response to the user's selection of the visual editing component(s).

Figure 2:
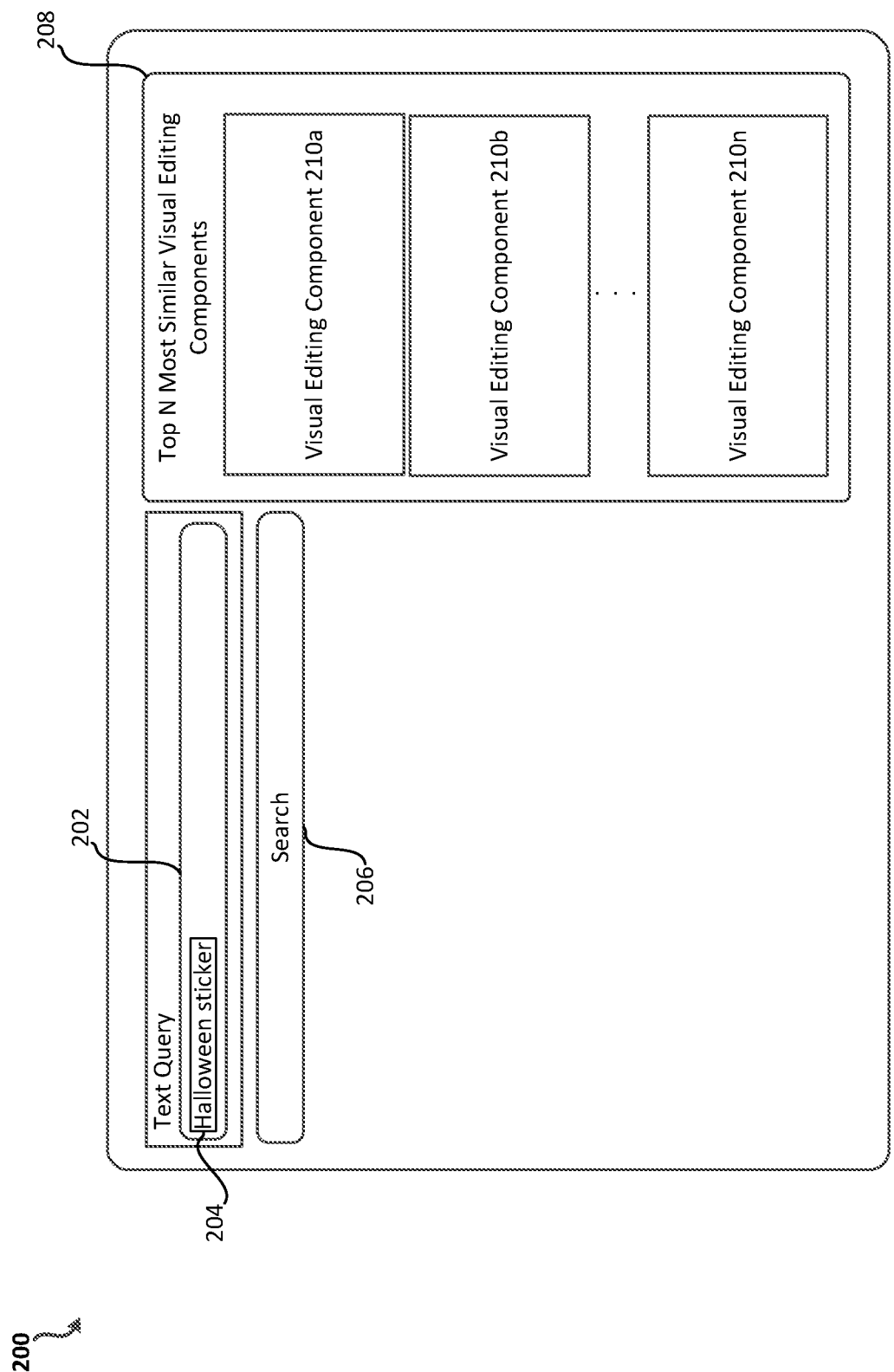
FIG. 2 shows an example user interface for searching editing components based on text in accordance with the present disclosure.

FIG. 2 shows an example user interface (UI) 200. The UI 200 may enable a user to search for editing components based on text (e.g., using the machine learning model 110). A user may enter a text query 204 into a search bar 202. The text query 204 may indicate that the user is searching for a particular visual editing component, such as a Halloween sticker. After entering the text query 204, the user may select a button 206.

Based on the user selecting the button 206, a list of recommendations 208 may be displayed. The list of recommendations 208 may indicate the top N most similar visual editing components to the text query 204. For example, the list of recommendations 208 may indicate information associated with a plurality of visual editing components 210a-n that correspond to the text query 204. The information associated with each of the plurality of visual editing components 210a-n may indicate a name of the visual editing component, a representative image or video associated with the visual editing component, and/or any other relevant information associated with the visual editing component. For example, each of the plurality of visual editing components 210a-n may be a "Halloween sticker" or a visual editing component that is similar to a "Halloween sticker."

In embodiments, the user may be able to select one or more of the plurality of visual editing components 210a-n. For example, the user may select a "Halloween sticker" from the plurality of visual editing components 210a-n that the user wants to apply to an image or a video. Based on the user selecting the "Halloween sticker" from the plurality of visual editing components 210a-n, the selected "Halloween sticker" may be applied (e.g., automatically, or by the user) to the image or video.

Figure 3:
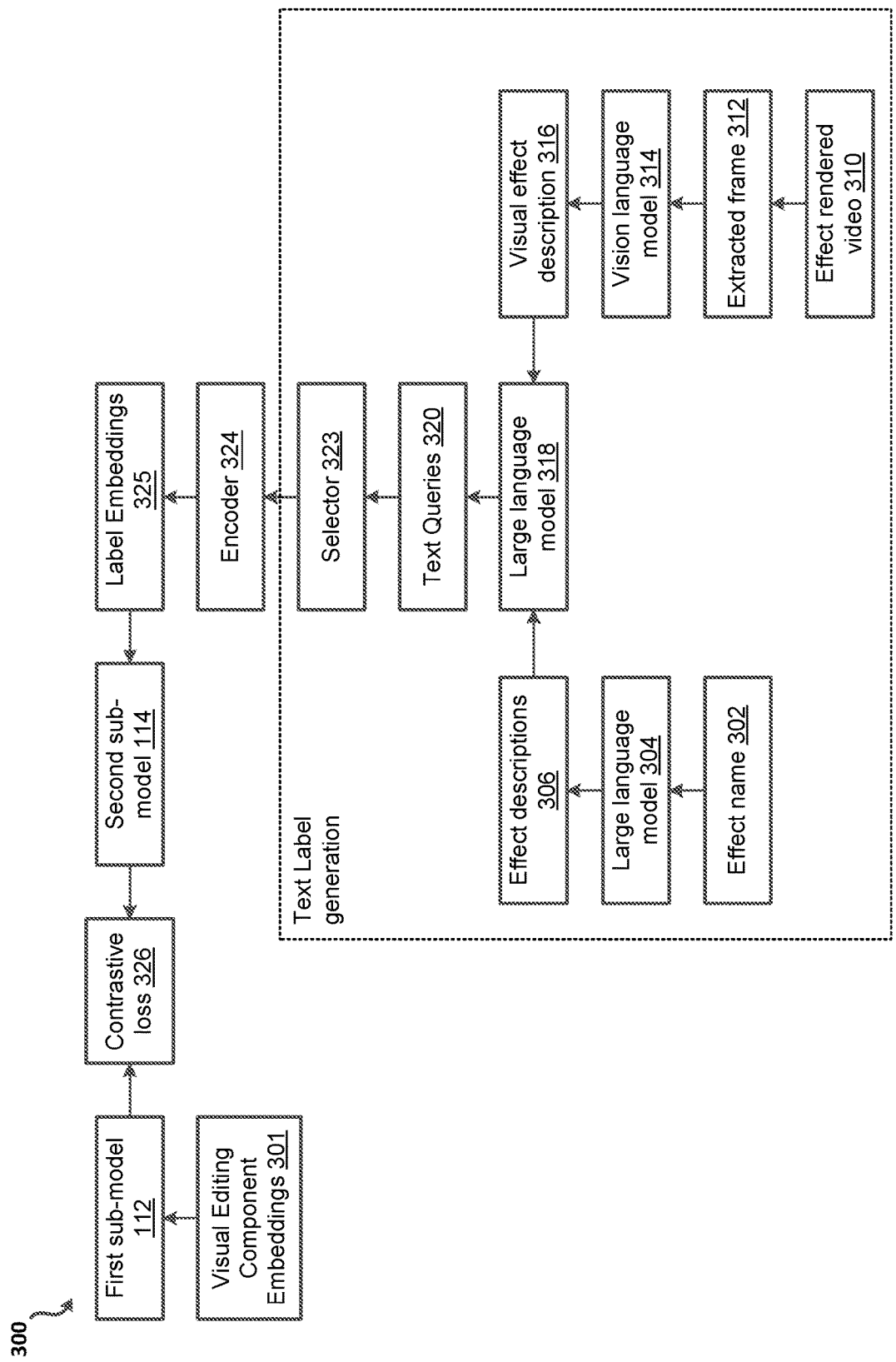
FIG. 3 shows example system for training a machine learning in accordance with the present disclosure.

FIG. 3 illustrates an example system 300 for training the machine learning model 110. The machine learning model 110 may be trained to align visual embeddings with text embeddings by projecting the visual embeddings and the text embeddings into a common space. The machine learning model 110 may be trained using training samples. The training samples may comprise embeddings 301 indicative of visual editing components and at least one label embedding 325 corresponding to each of the visual editing components. The visual editing components may be the same as, or different from, the visual editing components associated with the visual editing component embeddings 108. The visual editing components may be a subset of the visual editing components associated with the visual editing component embeddings 108, and vice versa.

The at least one label embedding corresponding to each of the visual editing components in the training samples may be automatically generated. The at least one label embedding corresponding to each of the visual editing components in the training samples may be automatically generated based on at least one of a name of each of the visual editing components or an image (e.g., video frame) to which each of the visual editing components is applied. For example, for a particular visual editing component, at least one label embedding corresponding to that particular visual editing component may be automatically generated based a name of that particular visual editing component or an image (e.g., video frame) to which that particular visual editing component is applied.

Automatically generating at least one text label for a particular visual editing component based on a name of the particular editing component may comprise generating a text description of a particular visual editing component based on a name (e.g., text name) of the particular visual editing component. For a particular visual editing component, a name of the particular visual editing component (e.g., the effect name 302) may be used to generate a text description (e.g., effect description 306) of the visual editing component. The effect name 302 may be input into a machine learning model, such as a large language model 304. The large language model 304 may generate the text description (e.g., effect description 306) based on the effect name 302. The large language model 304 may be prompted to generate the effect description 306 based on the effect name 302. For example, a user may enter a prompt such as "Describe the visual editing component named 'a particular effect name (e.g., effect name 302)' into the large language model 304. The large language model 304 may generate the effect description 306 based on receiving the prompt.

The effect description 306 may be used to generate the at least one text label for the visual editing component. For example, a large language model 318 may be used to generate the at least one text label for the visual editing component based on the effect description 306. The large language model 318 may the same as or different from the large language model 304. The large language model 318 may be prompted to generate at least one text query 320 based on the effect description 306. The at least one text query 320 may comprise one or more natural language text queries that a user is likely to enter if they are searching for visual editing component(s). The large language model 318 may generate the at least one text query 320 based on receiving the prompt. A selector 323 may randomly select a text query from at least one text query 320. The randomly selected text query may be the at least one text label for the visual editing component.

Automatically generating at least one text label for a particular visual editing component based on an image (e.g., video frame) to which that particular visual editing component is applied may comprise generating a text description of a particular visual editing component based on an image (e.g., video frame) to which that particular visual editing component is applied. For a particular visual editing component, the particular visual editing component may be applied to a video to generate an effect rendered video 310. An image (e.g., frame 312) may be extracted from the effect rendered video 310. The frame 312 may be used to generate a text description (e.g., effect description 316) of the visual editing component. The frame 312 may be input into a machine learning model, such as a vision language model 314. The vision language model 314 may generate the text description (e.g., effect description 316) based on the frame 312. The vision language model 314 may be prompted (e.g., by a user) to generate the effect description 316 based on the frame 312. For example, a user may enter a prompt such as "A video editing component is applied to the image. Describe this video editing component. Do not describe the background image" into the vision language model 314. The vision language model 314 may generate the effect description 316 based on receiving the prompt.

The effect description 316 may be used to generate the at least one text label for the visual editing component. For example, the large language model 318 may be used to generate the at least one text label for the visual editing component based on the effect description 316. The large language model 318 may be prompted (e.g., by the user) to generate the at least one text query 320 based on the effect description 316. The at least one text query 320 may comprise one or more natural language text queries that a user is likely to enter if they are searching for the visual editing component. The large language model 318 may generate the at least one text query 320 based on receiving the prompt. A selector 323 may randomly select a text query from at least one text query 320. The randomly selected text query may be the at least one text label for the visual editing component.

The label embedding(s) 325 corresponding to each of the visual editing components may be generated based on the at least one text label. The at least one text label may be input into an encoder 324. The encode 324 may be the same as or different from the encoder 104. The encoder 324 may generate the label embedding(s) 325 corresponding to each of the visual editing components based on encoding the at least one text label.

The first sub-model 112 of the machine learning model 110 may project the embeddings 301 indicative of visual editing components into the common space. The second sub-model 114 of the machine learning model 110 may project the label embedding(s) 325 corresponding to each of the visual editing components into the common space. The machine learning model may be trained to align the embeddings 301 indicative of visual editing components with the label embedding(s) 325 corresponding to each of the visual editing components using a contrastive loss function 326 (e.g., a Noise-Contrastive Estimation function). The machine learning model may be trained to align the embeddings 301 indicative of visual editing components with the label embedding(s) 325 corresponding to each of the visual editing components by optimizing the contrastive loss function 326. The contrastive loss function 326 may be, for example, $$L_q = -\log \frac{\exp\left(q \cdot \frac{k_+}{\tau}\right)}{\sum_{i=0}^{K} \exp\left(q \cdot \frac{k_i}{\tau}\right)},$$

where q represents the label embedding(s) 325, $k_i$ represents the label embedding(s) 325 corresponding to each of the visual editing components, and τ represents a temperature parameter on the loss. During training of the machine learning model 110, the encoder 324, the large language model 318, the visual language model 314 and the large language model 304 (if the large language model 318 is different from the large language model 304) may be kept frozen.

Figure 4:
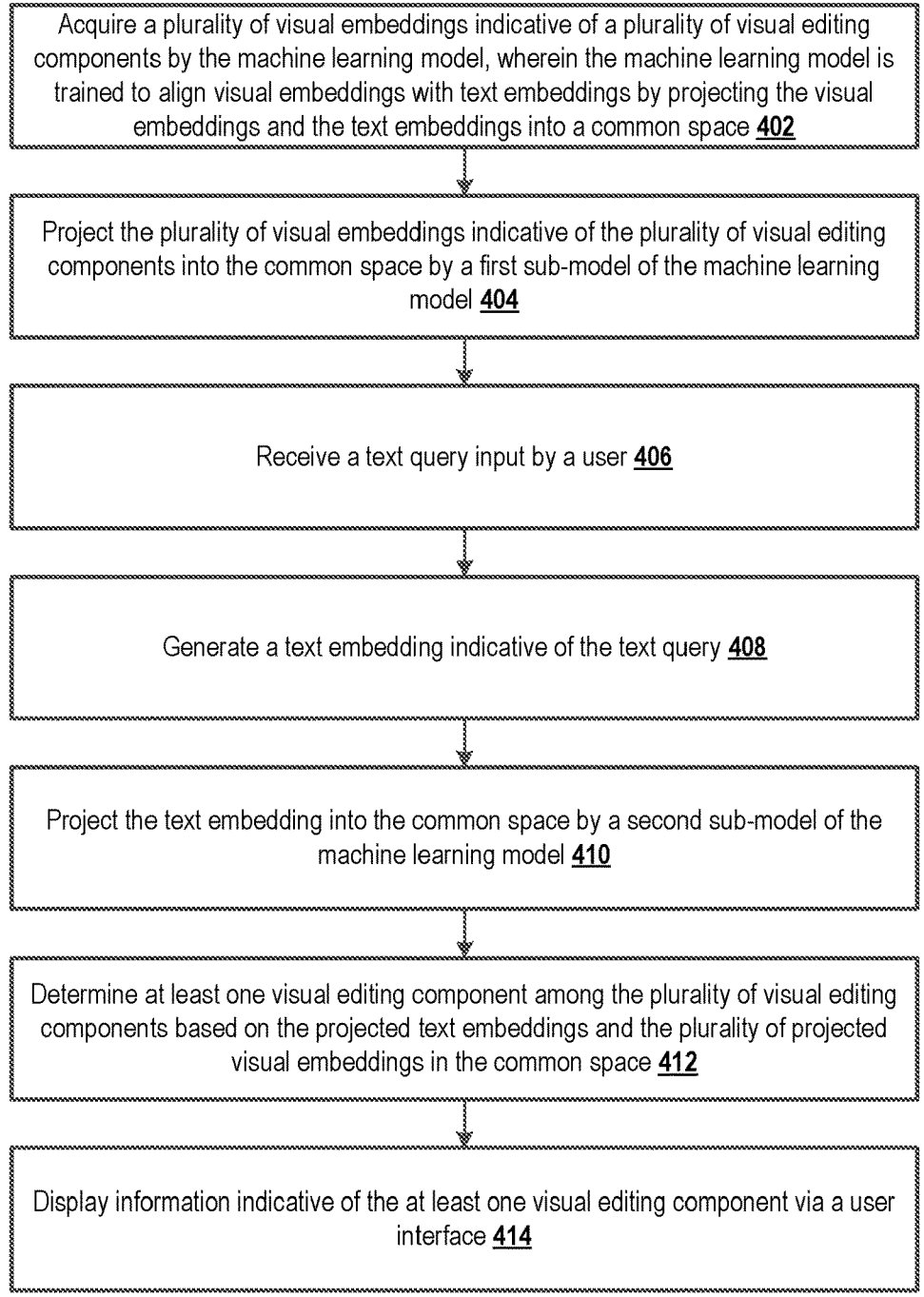
FIG. 4 shows an example process for searching editing components based on text using a machine learning model in accordance with the present disclosure.

FIG. 4 illustrates an example process 400 for searching editing components based on text using a machine learning model. Although depicted as a sequence of operations in FIG. 4, those of ordinary skill in the art will appreciate that various embodiments may add, remove, reorder, or modify the depicted operations.

At 402, a plurality of visual embeddings (e.g., representations, vectors, etc.) indicative of a plurality of visual editing components may be acquired. The plurality of visual editing components may comprise, for example, video effects, animations, video transitions, filters, stickers, and/or text (e.g., text overlays). The plurality of visual embeddings indicative of a plurality of visual editing components may be acquired by a machine learning model. The plurality of visual embeddings may be predetermined. For example, the plurality of visual embeddings may be stored in a database or library. The machine learning model may acquire the plurality of visual embeddings from the database or library. The machine learning model may be trained to align visual embeddings with text embeddings by projecting the visual embeddings and the text embeddings into a common space. At 404, the plurality of visual embeddings indicative of the plurality of visual editing components may be projected into the common space by a first sub-model of the machine learning model.

At 406, a text query input may be received. The text query may be received from (e.g., input by) a user. The text query may be a natural language query, such as one or more words, phrases, or sentences. The text query may indicate a type of visual editing component or a particular visual editing component that the user is searching for. The user may be searching for visual editing component(s) for editing and/or creating an image or video. At 408, a text embedding indicative of the text query may be generated. Generating the text embedding may comprise converting (e.g., encoding) the text query into the text embedding by an encoder, such as a CLIP encoder. At 410, the text embedding may be projected into the common space. The text embedding may be projected into the common space by a second sub-model of the machine learning model.

At 412, at least one visual editing component among the plurality of visual editing components may be determined. The at least one visual editing component among the plurality of visual editing components may be determined based on the projected text embeddings and the plurality of projected visual embeddings in the common space. For example, the at least one visual editing component among the plurality of visual editing components may be determined based on comparing the projected text embeddings and the plurality of projected visual embeddings in the common space. At 414, information indicative of the at least one visual editing component may be displayed. The information may be displayed via a user interface.

Figure 5:
FIG. 5 shows an example process for training a machine learning model in accordance with the present disclosure.

FIG. 5 illustrates an example process 500 for training a machine learning model. Although depicted as a sequence of operations in FIG. 5, those of ordinary skill in the art will appreciate that various embodiments may add, remove, reorder, or modify the depicted operations.

A machine learning model may be trained to align visual embeddings indicative of visual editing components with text embeddings by projecting the visual embeddings and the text embeddings into a common space. At 502, the machine learning model may be trained on training samples. The training samples may comprise embeddings indicative of the visual editing components and at least one label embedding corresponding to each of a plurality of visual editing components. At 504, the machine learning model may be trained using a contrastive loss function. For example, the machine learning model may be trained to align the embeddings indicative of visual editing components with the at least one label embedding corresponding to each of the visual editing components by optimizing the contrastive loss function. The contrastive loss function may be, for example, $$L_q = -\log \frac{\exp\left(q \cdot \frac{k_+}{\tau}\right)}{\sum_{i=0}^{K} \exp\left(q \cdot \frac{k_i}{\tau}\right)},$$

where q represents the at least one label embedding, $k_i$ represents the at least one label embedding corresponding to each of the visual editing components, and $\tau$ represents a temperature parameter on the loss.

Figure 6:
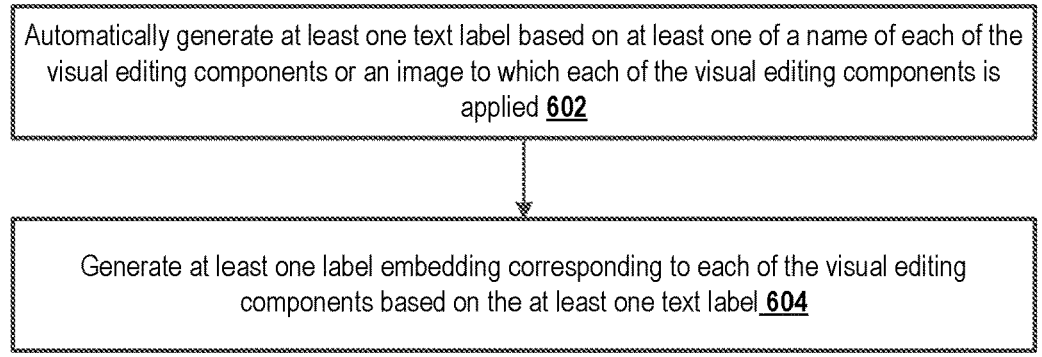
FIG. 6 shows an example process for generating label embeddings for training a machine learning model in accordance with the present disclosure.

FIG. 6 illustrates an example process 600 for generating label embeddings for training a machine learning model. Although depicted as a sequence of operations in FIG. 6, those of ordinary skill in the art will appreciate that various embodiments may add, remove, reorder, or modify the depicted operations.

A machine learning model may be trained using training samples. The training samples may comprise embeddings indicative of visual editing components and at least one label embedding corresponding to each of the visual editing components. The at least one label embedding corresponding to each of the visual editing components in the training samples may be automatically generated.

At 602, at least one text label may be automatically generated based on at least one of a name of each of the visual editing components or an image (e.g., video frame) to which each of the visual editing components is applied. For example, for a particular visual editing component, at least one label embedding corresponding to that particular visual editing component may be automatically generated based a name of that particular visual editing component or an image (e.g., video frame) to which that particular visual editing component is applied. At 604, at least one label embedding corresponding to each of the visual editing components may be generated based on the at least one text label. The at least one text label may be input into an encoder (e.g., a CLIP encoder). The encoder may generate the at least one label embedding corresponding to each of the visual editing components based on encoding the at least one text label.

FIG. 7 illustrates an example process 700 for generating label embeddings for training a machine learning model. Although depicted as a sequence of operations in FIG. 7, those of ordinary skill in the art will appreciate that various embodiments may add, remove, reorder, or modify the depicted operations.

At least one text label for a particular visual editing component may be automatically generated based on a name of the particular editing component. The particular visual editing component may comprise a visual editing component for training a machine learning model. At 702, a text description of a particular visual editing component may be generated. The text description may be generated based on a name (e.g., text name) of the particular visual editing component. The name may be input into a large language model. The large language model may generate the text description based on the name. The large language model may be prompted (e.g., by a user) to generate the text description based on the name. For example, user may enter a prompt such as "Describe the visual editing component named 'name' into the large language model. The large language model may generate the text description based on receiving the prompt.

At 704, at least one text label may be generated. The at least one text label may be associated with the particular visual editing component based on the text description. The large language model (or a different large language model) may be used to generate the at least one text label for the visual editing component based on the text description. The large language model may be prompted (e.g., by the user) to generate at least one text query based on the text description. The at least one text query may comprise one or more natural language text queries that a user is likely to enter if they are searching for the visual editing component. For example, user may enter a prompt such as "'name' is a video visual effect that can be described as 'text description.' Suppose there is a video editing component database. Suggest user search queries to retrieve results similar to this video editing component." The large language model may generate the at least one text query based on receiving the prompt. A selector may randomly select a text query from the at least one text query. The randomly selected text query may be the at least one text label for the visual editing component.

At 706, at least one label embedding corresponding to the particular visual editing component may be generated. The at least one label embedding may be generated based on the at least one text label. The at least one text label may be input into an encoder. The encoder may generate the at least one label embedding corresponding to each of the visual editing components based on encoding the at least one text label.

Figure 8:
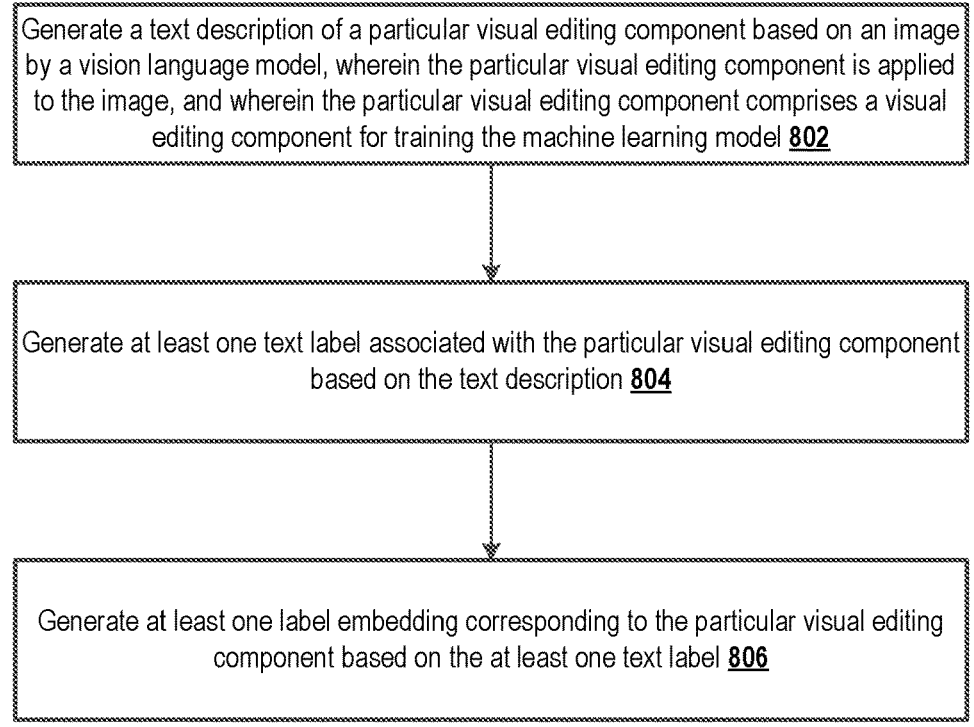
FIG. 8 shows an example process for generating label embeddings for training a machine learning model in accordance with the present disclosure.

FIG. 8 illustrates an example process 800 for generating label embeddings for training a machine learning model. Although depicted as a sequence of operations in FIG. 8, those of ordinary skill in the art will appreciate that various embodiments may add, remove, reorder, or modify the depicted operations.

At least one text label for a particular visual editing component may be automatically generated based on an image (e.g., video frame) to which that particular visual editing component is applied. The particular visual editing component may comprise a visual editing component for training a machine learning model. At 802, a text description of a particular visual editing component may be generated. The text description may be generated based on an image (e.g., video frame) to which that particular visual editing component is applied. The image may be input into a vision language model. The vision language model may generate the text description based on the image. The vision language model may be prompted (e.g., by a user) to generate the text description based on the image. For example, user may enter a prompt such as "A video editing component is applied to the image. Describe this video editing component. Do not describe the background image" into the vision language model. The vision language model may generate the text description based on receiving the prompt.

At 804, at least one text label may be generated. The at least one text label may be associated with the particular visual editing component based on the text description. A large language model may be used to generate the at least one text label for the visual editing component based on the text description. The large language model may be prompted (e.g., by the user) to generate at least one text query based on the text description. The at least one text query may comprise one or more natural language text queries that a user is likely to enter if they are searching for the visual editing component. For example, user may enter a prompt such as "'name' is a video visual effect that can be described as 'text description.' Suppose there is a video editing component database. Suggest user search queries to retrieve results similar to this video editing component." The large language model may generate the at least one text query based on receiving the prompt. A selector may randomly select a text query from the at least one text query. The randomly selected text query may be the at least one text label for the visual editing component.

At 806, at least one label embedding corresponding to the particular visual editing component may be generated. The at least one label embedding may be generated based on the at least one text label. The at least one text label may be input into an encoder. The encoder may generate the at least one label embedding corresponding to each of the visual editing components based on encoding the at least one text label.

Figure 9:
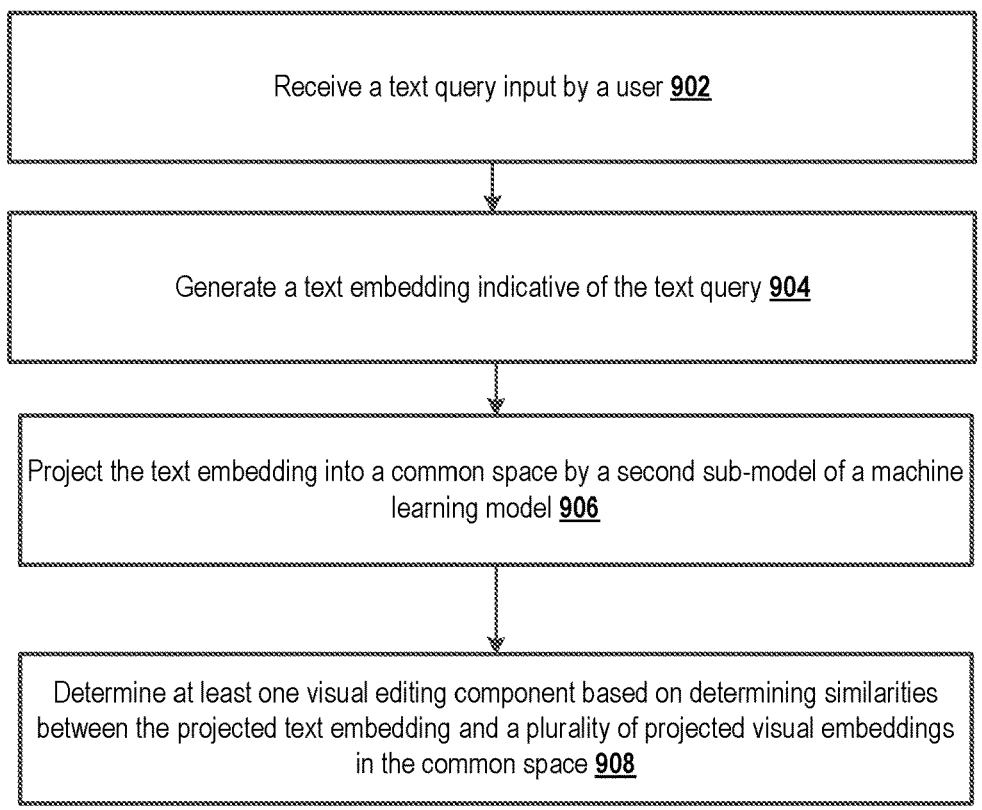
FIG. 9 shows an example process for searching editing components based on text using a machine learning model in accordance with the present disclosure.

FIG. 9 illustrates an example process 900 for searching editing components based on text using a machine learning model. Although depicted as a sequence of operations in FIG. 9, those of ordinary skill in the art will appreciate that various embodiments may add, remove, reorder, or modify the depicted operations.

At 902, a text query input may be received. The text query may be input by a user. The text query may be a natural language query, such as one or more words, phrases, or sentences. The text query may indicate a type of visual editing component or a particular visual editing component that the user is searching for. The user may be searching for a visual editing component for editing and/or creating an image or video. At 904, a text embedding indicative of the text query may be generated. Generating the text embedding may comprise converting (e.g., encoding) the text query into the text embedding by an encoder, such as a CLIP encoder. At 906, the text embedding may be projected into the common space. The text embedding may be projected into the common space by a second sub-model of the machine learning model.

At 908, at least one visual editing component may be determined. The at least one visual editing component may be determined based on determining similarities between the projected text embedding and a plurality of projected visual embeddings in the common space. The projected text embedding may be compared to each of the plurality of projected visual embeddings to determine a similarity (e.g., using cosine similarity, K-nearest neighbors, etc.) between the projected text embedding and each of the plurality of projected visual embeddings. The top N (e.g., top one, top two, top three, top five, etc.) projected visual embeddings of the plurality of projected visual embeddings having a greatest (e.g., highest) similarity to the projected text embedding may be determined. The determined at least one visual editing component may be those visual editing component(s) corresponding to the top N aligned visual editing component embeddings.

Figure 10:
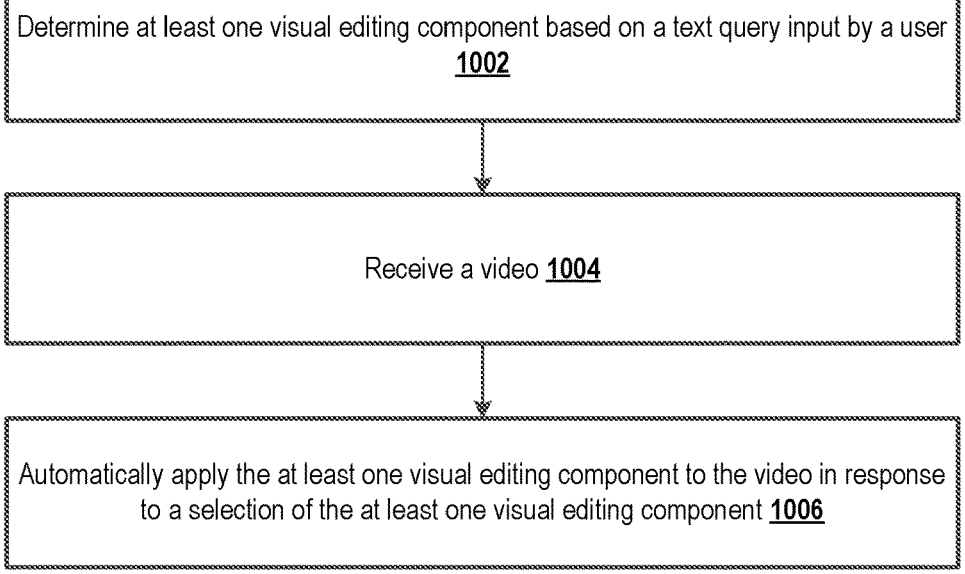
FIG. 10 shows an example process for searching editing components based on text using a machine learning model in accordance with the present disclosure.

FIG. 10 illustrates an example process 1000 for searching editing components based on text using a machine learning model. Although depicted as a sequence of operations in FIG. 10, those of ordinary skill in the art will appreciate that various embodiments may add, remove, reorder, or modify the depicted operations.

A text query input may be received. The text query may be input by a user. The text query may be a natural language query, such as one or more words, phrases, or sentences. The text query may indicate a type of visual editing component or a particular visual editing component that the user is searching for. At 1002, at least one visual editing component may be determined. The at least one visual editing component may be determined based on the text query input by a user. The at least one visual editing component may correspond to the type of visual editing component or a particular visual editing component that the user is searching for. At 1004, a video may be received. The video may be uploaded by the user. At 1006, the at least one visual editing component may be automatically applied to the video. The at least one visual editing component may be automatically applied to the video in response to a selection of the at least one visual editing component (e.g., by the user).

Figure 11:
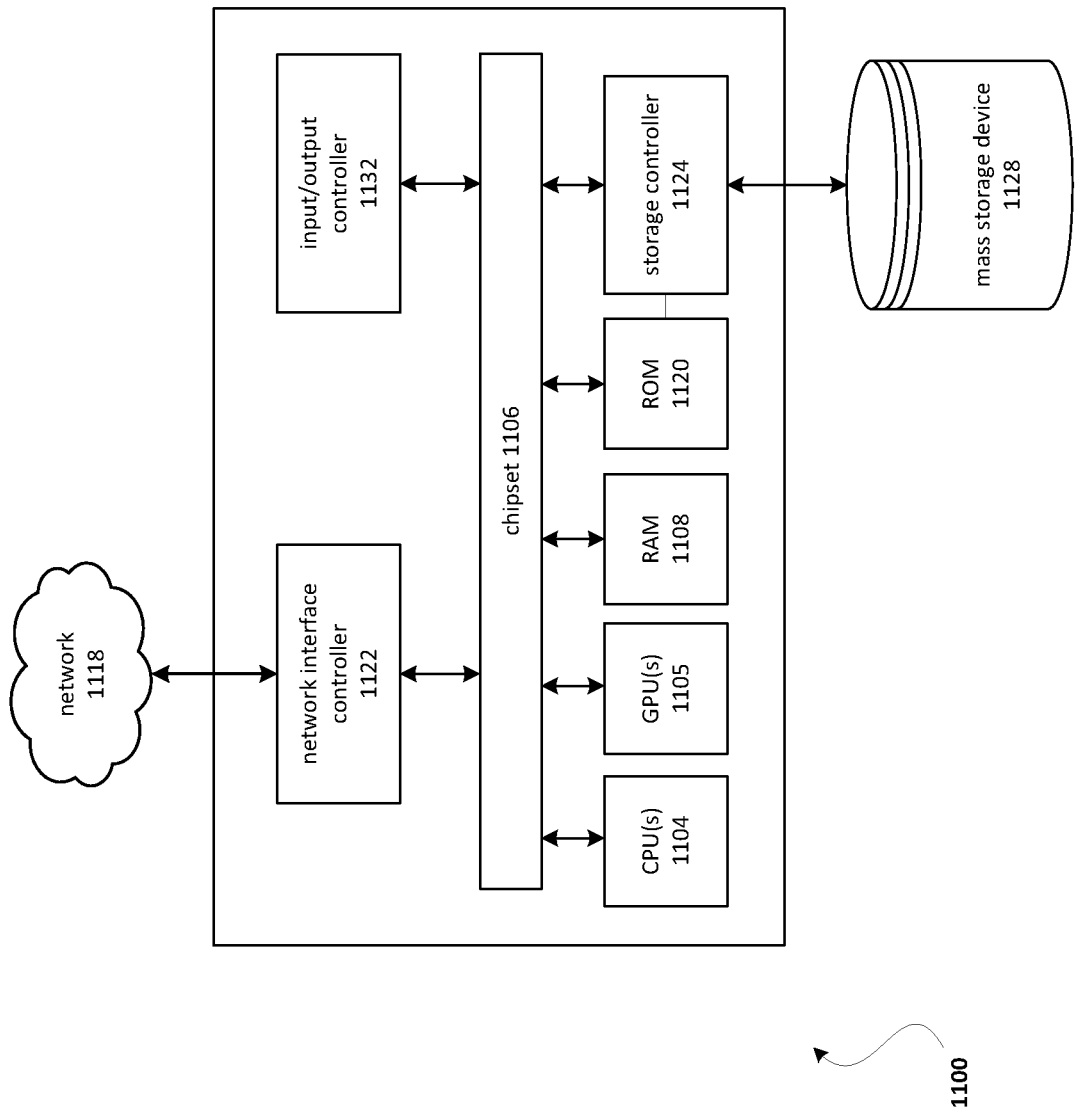
FIG. 11 shows an example computing device which may be used to perform any of the techniques disclosed herein.

FIG. 11 illustrates a computing device that may be used in various aspects, such as the services, networks, sub-models, and/or devices depicted in FIG. 1. With regard to FIG. 1, any or all of the components may each be implemented by one or more instance of a computing device 1100 of FIG. 11. The computer architecture shown in FIG. 11 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1100 may include a baseboard, or "motherboard," which is a printed circuit board to which a multitude of components or devices may be connected by way of a system bus or other electrical communication paths. One or more central processing units (CPUs) 1104 may operate in conjunction with a chipset 1106. The CPU(s) 1104 may be standard programmable processors that perform arithmetic and logical operations necessary for the operation of the computing device 1100.

The CPU(s) 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1104 may be augmented with or replaced by other processing units, such as GPU(s) 1105. The GPU(s) 1105 may comprise processing units specialized for but not necessarily limited to highly parallel computations, such as graphics and other visualization-related processing.

A chipset 1106 may provide an interface between the CPU(s) 1104 and the remainder of the components and devices on the baseboard. The chipset 1106 may provide an interface to a random-access memory (RAM) 1108 used as the main memory in the computing device 1100. The chipset 1106 may further provide an interface to a computer-readable storage medium, such as a read-only memory (ROM) 1120 or non-volatile RAM (NVRAM) (not shown), for storing basic routines that may help to start up the computing device 1100 and to transfer information between the various components and devices. ROM 1120 or NVRAM may also store other software components necessary for the operation of the computing device 1100 in accordance with the aspects described herein.

The computing device 1100 may operate in a networked environment using logical connections to remote computing nodes and computer systems through local area network (LAN). The chipset 1106 may include functionality for providing network connectivity through a network interface controller (NIC) 1122, such as a gigabit Ethernet adapter. A NIC 1122 may be capable of connecting the computing device 1100 to other computing nodes over a network 1116. It should be appreciated that multiple NICs 1122 may be present in the computing device 1100, connecting the computing device to other types of networks and remote computer systems.

The computing device 1100 may be connected to a mass storage device 1128 that provides non-volatile storage for the computer. The mass storage device 1128 may store system programs, application programs, other program modules, and data, which have been described in greater detail herein. The mass storage device 1128 may be connected to the computing device 1100 through a storage controller 1124 connected to the chipset 1106. The mass storage device 1128 may consist of one or more physical storage units. The mass storage device 1128 may comprise a management component 1110. A storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1100 may store data on the mass storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1128 is characterized as primary or secondary storage and the like.

For example, the computing device 1100 may store information to the mass storage device 1128 by issuing instructions through a storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may further read information from the mass storage device 1128 by detecting the physical states or characteristics of one or more particular locations within the physical storage units.

In addition to the mass storage device 1128 described above, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1128 depicted in FIG. 11, may store an operating system utilized to control the operation of the computing device 1100. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1128 may store other system or application programs and data utilized by the computing device 1100.

The mass storage device 1128 or other computer-readable storage media may also be encoded with computer-executable instructions, which, when loaded into the computing device 1100, transforms the computing device from a general-purpose computing system into a special-purpose computer capable of implementing the aspects described herein. These computer-executable instructions transform the computing device 1100 by specifying how the CPU(s) 1104 transition between states, as described above. The computing device 1100 may have access to computer-readable storage media storing computer-executable instructions, which, when executed by the computing device 1100, may perform the methods described herein.

A computing device, such as the computing device 1100 depicted in FIG. 11, may also include an input/output controller 1132 for receiving and processing input from a number of input devices, such as a keyboard, a mouse, a touchpad, a touch screen, an electronic stylus, or other type of input device. Similarly, an input/output controller 1132 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing device may be a physical computing device, such as the computing device 1100 of FIG. 11. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method for searching editing components based on text using a machine learning model, comprising:
   acquiring a plurality of visual embeddings indicative of a plurality of visual editing components by the machine learning model, wherein the machine learning model is trained to align visual embeddings with text embeddings by projecting the visual embeddings and the text embeddings into a common space, and wherein the plurality of visual editing components comprise effects configured to be applied to videos;
   projecting the plurality of visual embeddings indicative of the plurality of visual editing components into the common space by a first sub-model of the machine learning model;
   receiving a text query input by a user;
   generating a text embedding indicative of the text query;
   projecting the text embedding into the common space by a second sub-model of the machine learning model;
   determining at least one visual editing component among the plurality of visual editing components based on the projected text embedding and the plurality of projected visual embeddings in the common space;
   displaying information indicative of the at least one visual editing component via a user interface; and
   applying the at least one visual editing component to a video in response to user input selecting the at least one visual editing component.

2. The method of claim 1, further comprising:
   training the machine learning model using training samples, wherein the training samples comprise embeddings indicative of visual editing components and at least one label embedding corresponding to each of the visual editing components.

3. The method of claim 2, further comprising:
   automatically generating at least one text label based on at least one of a name of each of the visual editing components or an image to which each of the visual editing components is applied; and
   generating the at least one label embedding corresponding to each of the visual editing components based on the at least one text label.

4. The method of claim 3, further comprising:
   generating a text description of a particular visual editing component based on a name of the particular visual editing component, wherein the particular visual editing component comprises any of the visual editing components for training the machine learning model; and
   generating at least one text label associated with the particular visual editing component based on the text description.

5. The method of claim 3, further comprising:
   generating a text description of a particular visual editing component based on the image by a vision language model; and
   generating at least one text label associated with the particular visual editing component based on the text description, wherein the particular visual editing component comprises any of the visual editing components for training the machine learning model.

6. The method of claim 1, further comprising:
   training the machine learning model to align the visual embeddings with the text embeddings using a contrastive loss function.

7. The method of claim 1, further comprising:
   determining the at least one visual editing component among the plurality of visual editing components based on determining similarities between the projected text embedding and the plurality of projected visual embeddings in the common space.

8. The method of claim 1, further comprising:
   receiving a video; and
   automatically applying the at least one visual editing component to the video in response to a selection of the at least one visual editing component.

9. A system for searching editing components based on text using a machine learning model, comprising:
   at least one processor; and
   at least one memory communicatively coupled to the at least one processor and comprising computer-readable instructions that upon execution by the at least one processor cause the at least one processor to perform operations comprising:
      acquiring a plurality of visual embeddings indicative of a plurality of visual editing components by the machine learning model, wherein the machine learning model is trained to align visual embeddings with text embeddings by projecting the visual embeddings and the text embeddings into a common space, and wherein the plurality of visual editing components comprise effects configured to be applied to videos;

projecting the plurality of visual embeddings indicative of the plurality of visual editing components into the common space by a first sub-model of the machine learning model;

receiving a text query input by a user;

generating a text embedding indicative of the text query;

projecting the text embedding into the common space by a second sub-model of the machine learning model;

determining at least one visual editing component among the plurality of visual editing components based on the projected text embedding and the plurality of projected visual embeddings in the common space;

displaying information indicative of the at least one visual editing component via a user interface; and applying the at least one visual editing component to a video in response to user input selecting the at least one visual editing component.

10. The system of claim 9, the operations further comprising:

training the machine learning model using training samples, wherein the training samples comprise embeddings indicative of visual editing components and at least one label embedding corresponding to each of the visual editing components.

11. The system of claim 10, the operations further comprising:

automatically generating at least one text label based on at least one of a name of each of the visual editing components or an image to which each of the visual editing components is applied; and generating the at least one label embedding corresponding to each of the visual editing components based on the at least one text label.

12. The system of claim 11, the operations further comprising:

generating a text description of a particular visual editing component based on a name of the particular visual editing component, wherein the particular visual editing component comprises any of the visual editing components for training the machine learning model; and generating at least one text label associated with the particular visual editing component based on the text description.

13. The system of claim 11, the operations further comprising:

generating a text description of a particular visual editing component based on the image by a vision language model; and generating at least one text label associated with the particular visual editing component based on the text description, wherein the particular visual editing component comprises any of the visual editing components for training the machine learning model.

14. The system of claim 9, the operations further comprising:

training the machine learning model to align the visual embeddings with the text embeddings using a contrastive loss function.

15. A non-transitory computer-readable storage medium, storing computer-readable instructions that upon execution by a processor cause the processor to implement operations comprising:

acquiring a plurality of visual embeddings indicative of a plurality of visual editing components by the machine learning model, wherein the machine learning model is trained to align visual embeddings with text embeddings by projecting the visual embeddings and the text embeddings into a common space, and wherein the plurality of visual editing components comprise effects configured to be applied to videos;

projecting the plurality of visual embeddings indicative of the plurality of visual editing components into the common space by a first sub-model of the machine learning model;

receiving a text query input by a user;

generating a text embedding indicative of the text query;

projecting the text embedding into the common space by a second sub-model of the machine learning model;

determining at least one visual editing component among the plurality of visual editing components based on the projected text embedding and the plurality of projected visual embeddings in the common space;

displaying information indicative of the at least one visual editing component via a user interface; and applying the at least one visual editing component to a video in response to user input selecting the at least one visual editing component.

16. The non-transitory computer-readable storage medium of claim 15, the operations further comprising:

training the machine learning model using training samples, wherein the training samples comprise embeddings indicative of visual editing components and at least one label embedding corresponding to each of the visual editing components.

17. The non-transitory computer-readable storage medium of claim 16, the operations further comprising:

automatically generating at least one text label based on at least one of a name of each of the visual editing components or an image to which each of the visual editing components is applied; and generating the at least one label embedding corresponding to each of the visual editing components based on the at least one text label.

18. The non-transitory computer-readable storage medium of claim 17, the operations further comprising:

generating a text description of a particular visual editing component based on a name of the particular visual editing component, wherein the particular visual editing component comprises any of the visual editing components for training the machine learning model; and generating at least one text label associated with the particular visual editing component based on the text description.

19. The non-transitory computer-readable storage medium of claim 17, the operations further comprising:

generating a text description of a particular visual editing component based on the image by a vision language model; and generating at least one text label associated with the particular visual editing component based on the text description, wherein the particular visual editing component comprises any of the visual editing components for training the machine learning model.

20. The non-transitory computer-readable storage medium of claim 15, the operations further comprising:
  training the machine learning model to align the visual embeddings with the text embeddings using a contrastive loss function.

\* \* \* \* \*